(12) United States Patent
Nagao et al.

(10) Patent No.: US 7,093,412 B1
(45) Date of Patent: Aug. 22, 2006

(54) GLASS BASE MATERIAL PACKING METHOD

(75) Inventors: Takaaki Nagao, Annaka (JP); Tadakatsu Shimada, Annaka (JP); Hideo Hirasawa, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/512,276

(22) Filed: Feb. 24, 2000

(30) Foreign Application Priority Data

Feb. 24, 1999 (JP) ................. 11-046143

(51) Int. Cl.
*B65B 11/58* (2006.01)
*B65D 85/20* (2006.01)

(52) U.S. Cl. .................. 53/449; 53/409; 53/444; 53/139.5; 206/446; 206/594

(58) Field of Classification Search .......... 53/472, 53/449, 139.5, 49, 444, 409; 206/408, 446, 206/522, 591, 594, 419, 421
See application file for complete search history.

(56) References Cited

U.S. PATENT DOCUMENTS

| | | | | | |
|---|---|---|---|---|---|
| 2,458,737 | A | * | 1/1949 | Salkowitz | 206/446 |
| 3,187,886 | A | * | 6/1965 | Honey | 406/189 |
| 3,384,221 | A | * | 5/1968 | Houtman | 206/523 |
| 3,572,574 | A | * | 3/1971 | Mears | 206/521 |
| 4,098,050 | A | | 7/1978 | Dietz et al. | 53/26 |
| 4,190,160 | A | * | 2/1980 | Andersen et al. | 188/377 |
| 4,267,928 | A | * | 5/1981 | Curry, Jr. | 206/497 |
| 4,268,567 | A | * | 5/1981 | Harmony | 428/195 |
| 4,560,069 | A | * | 12/1985 | Simon | 206/591 |
| 4,573,578 | A | * | 3/1986 | Greminger et al. | 206/524.4 |
| 4,643,307 | A | * | 2/1987 | Wilkinson | 206/443 |
| 4,681,225 | A | * | 7/1987 | Schuster | 206/426 |
| 4,880,114 | A | * | 11/1989 | Korte | 206/418 |
| 4,880,119 | A | * | 11/1989 | Simon | 206/584 |
| 4,882,893 | A | | 11/1989 | Spencer et al. | |
| 4,955,480 | A | * | 9/1990 | Sexton | 206/438 |
| 5,213,215 | A | * | 5/1993 | Prevot | 206/446 |
| 5,236,088 | A | * | 8/1993 | Dhority et al. | 206/205 |
| 5,274,846 | A | * | 1/1994 | Kolsky | 2/16 |

(Continued)

FOREIGN PATENT DOCUMENTS

EP  0336107  10/1998

(Continued)

OTHER PUBLICATIONS

Patent Abstract of Japan, vol. 2000 No. 6, Mar. 28, 2000.

(Continued)

*Primary Examiner*—Louis Huynh
(74) *Attorney, Agent, or Firm*—Smith, Gambrell & Russell, LLP

(57) ABSTRACT

A method of packing a glass base material (10, 20, 30), which is a base material of an optical fiber comprising packing the glass base material (10, 20, 30) into a cylindrical container (16, 26, 36). The packing has: putting the glass base material (10, 20, 30) into a plastic bag (12, 22, 32); and packing the glass base material (10, 20, 30), which is put into the plastic bag (12, 22, 32), into the cylindrical container (16, 26, 36). The packing further has: wrapping the glass base material (10, 20, 30), which is put into the plastic bag (12, 22, 32), with air packing material (14, 24, 34), which contains air inside; and packing the glass base material (10, 20, 30) wrapped with the air packing material (14, 24, 34) into the cylindrical container (16, 26, 36).

9 Claims, 7 Drawing Sheets

U.S. PATENT DOCUMENTS

| | | | | |
|---|---|---|---|---|
| 5,450,948 | A | * | 9/1995 | Beausoleil et al. ......... 206/204 |
| 5,515,971 | A | * | 5/1996 | Segrest ...................... 206/446 |
| 5,600,958 | A | * | 2/1997 | Henning et al. ............... 62/60 |
| 5,665,456 | A | * | 9/1997 | Kannankeril et al. ....... 156/209 |
| 5,738,216 | A | * | 4/1998 | Warner ...................... 206/523 |
| 6,055,825 | A | * | 5/2000 | Choy .......................... 62/371 |
| 6,546,756 | B1 | * | 4/2003 | Fewkes et al. ............... 65/376 |

FOREIGN PATENT DOCUMENTS

| | | | |
|---|---|---|---|
| EP | 0 916 623 A1 | | 5/1999 |
| EP | 1369393 | * | 12/2003 |
| JP | 9-110454 | | 4/1997 |
| JP | 9-156711 | | 6/1997 |
| JP | 409249425 | * | 9/1997 |
| JP | 11-79771 | | 3/1999 |
| JP | 2000-143269 | * | 5/2000 |
| WO | WO 98/18733 | | 5/1998 |

OTHER PUBLICATIONS

Patent Abstract of Japan, vol. 1997, No. 8, Apr. 28, 1997.

English Abstract of JP 9-110454.

English Translation of Preliminary Notice of the Second Office Action from Taiwan Patent Office.

Preliminary Notice of the Second Office Action from Taiwan Patent Office.

* cited by examiner

GLASS BASE MATERIAL PACKING METHOD

This patent application claims priority based on a Japanese patent application, H11-046143 filed on Feb. 24, 1999, the contents of which are incorporated herein by reference.

BACKGROUND OF INVENTION

1. Field of the Invention

The present invention is related to a packing method for packing quartz glass or quartz glass base material, which is a base material of optical fibers used for optical communications.

2. Description of Related Art

Quartz glass or a quartz glass base material, which is a base material of optical fibers used for optical communications, is manufactured by sintering and vitrifying soot sediment. The soot sediment can be manufactured by one of vapor-phase axial deposition (VAD) method, outside vapor deposition (OVD) method, and modified chemical vapor deposition (MCVD) method. The glass base material is elongated to a predetermined diameter and then shipped.

If there is a crack on the surface of the glass base material, the optical fiber drawn from the glass base material having a crack will be cut during the drawing. Therefore, much care is needed in order not to damage the surface of the glass base material. Conventionally, glass base material was put into a square-shaped box, and the opening between the glass base material and the box was filled with a cushion for shipping.

Recently, because of the development of the optical fiber communication industry, the demand for quartz glass base material has increased, and the quantity of shipments of glass base material has also increased. A plurality of glass base materials is usually put together into one box to be shipped.

However, if a plurality of glass base materials are packed together in one box, the glass base materials may be damaged because the glass base materials may contact with each other due to the vibration occurring during the transportation of the glass base materials. The cushion is filled in the opening between the glass base material and the box to prevent the glass base material from contacting with each other. However, the conventional square-shaped box has large openings between the glass base material and the box and thus needs a large amount of cushion material. Furthermore, when packing a plurality of glass base materials in one box, if the cushion is made with soft material, the glass base materials inside the box may collide with each other due to the vibration during the transportation. In the worst case, the glass base materials may crack during the transportation.

Therefore, every individual glass base materials must be wrapped with buffer material for packing, such as air packing, which contains air inside. Then, one piece of the glass base material is packed in one box, or a plurality of glass base materials are packed together in one box to prevent cracking and breaking. However, the conventional packing method requires a large amount of buffer material and the box, and thus the conventional packing method has an economic disadvantage. Furthermore, the conventional packing method needs a large amount labor and time for packing. If there is space between the end of the glass base material and the end of the box in the longitudinal direction, the glass base material moves in the longitudinal direction during the transportation. Thereby, the end of the glass base material contacts with the box which may cause a crack or breakage of the glass base material.

SUMMARY OF THE INVENTION

Therefore, it is an object of the present invention to provide a packing method for glass base materials which overcomes the above issues in the related art. This object is achieved by combinations described in the independent claims. The dependent claims define further advantageous and exemplary combinations of the present invention.

According to the first aspect of the present invention, a method of packing a glass base material, which is a base material of an optical fiber can be provided. The method of packing a glass base material comprises packing the glass base material into a cylindrical container.

The packing may have: putting the glass base material into a plastic bag; and packing the glass base material, which is put into the plastic bag, into the cylindrical container. The packing may further have: wrapping the glass base material, which is put into the plastic bag, with air packing material, which contains air inside; and packing the glass base material wrapped with the air packing material into the cylindrical container.

The wrapping may wrap the glass base material, which is put into the plastic bag, with three-layers of the air packing material. The packing may pack the glass base material in the cylindrical container which has an inside diameter of approximately 10 mm larger than a diameter of the glass base material.

The packing may further have: capping both ends of the cylindrical container, which packs the glass base material, by caps. The packing may further have: filling space between an end of the glass base material and the cap with a cushion material. The packing may further have: providing an inside cap, which has a shape that can fit with a shape of end of the glass base material, on a space between the end of the glass base material and the cap.

The method of packing a glass base material can be provided which further comprises: packing a plurality of the cylindrical containers, each of which is packed with the glass base material, into a cylindrical container. The method of packing a glass base material can be provided which further comprises: packing a plurality of the cylindrical containers, each of which is packed with the glass base material, into a square-shaped box.

The packing may pack a plurality of the glass base materials into the cylindrical container. The packing may have: putting each of the plurality of the glass base materials into each of individual plastic bags; and packing the plurality of the glass base materials, each of which are put into the each of individual plastic bags, into the cylindrical container.

The packing may further have: wrapping together the plurality of the glass base materials, each of which are put into the each of individual plastic bags, with air packing material, which contains air inside; and packing the plurality of the glass base materials wrapped with the air packing material into the cylindrical container.

The packing may pack the plurality of the glass base materials in the cylindrical container which has an inside diameter of approximately 10 mm larger than total diameter of the plurality of the glass base materials. The packing may have: putting each of seven pieces of the glass base materials into the each of individual plastic bags; and bundling together the seven pieces of the glass base materials, each of which are put into the each of individual plastic bags, such that six pieces of the glass base materials are arranged in a hexagonal arrangement around one central the glass base material; and packing the seven pieces of the glass base materials bundled together into the cylindrical container.

According to the second aspect of the present invention, a packing can be provided which comprises: a glass base material which is a base material of an optical fiber; and a cylindrical container which contains the glass base material inside.

A packing can be provided which further comprises: a plastic bag which packs the glass base material inside; wherein the cylindrical container contains the glass base material which is packed in the plastic bag.

A packing can be provided which further comprises: an air packing material which wraps the glass base material packed in the plastic bag; wherein the cylindrical container contains the glass base material which is wrapped with the air packing material.

The air packing material may wrap a plurality of the glass base materials, each of which is packed in each of individual the plastic bags; and the cylindrical container contains the plurality of the glass base materials wrapped with the air packing material. The cylindrical container may contain seven pieces of the glass base materials, each of which are put into the each of individual plastic bags; and the air packing material wraps the seven pieces of the glass base materials such that six pieces of the glass base materials are arranged in a hexagonal arrangement around one central the glass base material.

The cylindrical container may have an inside diameter of approximately 10 mm larger than a diameter of the glass base material. The cylindrical container can be made of at least one of cardboard, plastic, and cardboard plastic. The cylindrical container may have caps on both ends of the cylindrical container. The caps can be made of at least one of cardboard, plastic, and cardboard plastic.

A packing can be provided which further comprises a cushion material which fills space between an end of the glass base material and the cap. The cushion material can be made of at least one of styrene foam and an elastic body made of rubber. A packing can be provided which further comprises an inside cap which has a shape that can fit with a shape of end of the glass base material.

The inside cap can be made of at least one of styrene foam and an elastic body made of rubber.

A packing can be provided which further comprises a secondary cylindrical container which contains a plurality of the cylindrical containers, each of which is packed with the glass base material. A packing can be provided which further has a square-shaped box which contains a plurality of the cylindrical containers, each of which is packed with the glass base material.

This summary of the invention does not necessarily describe all necessary features. The invention may also be a sub-combination of these described features.

DETAILED DESCRIPTION OF THE INVENTION

The invention will now be described based on the preferred embodiments, which do not intend to limit the scope of the present invention, but exemplify the invention. All of the features and the combinations thereof described in the embodiment are not necessarily essential to the invention.

Figure 1:
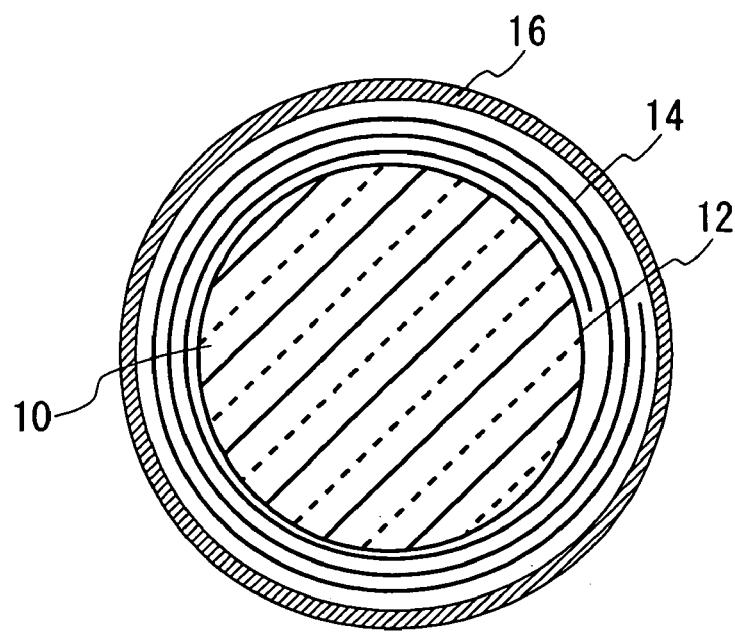
FIG. 1 shows a packing method of an embodiment of the present invention.

FIG. 1 shows a packing method of an embodiment of the present invention. The glass base material 10 is put into the plastic bag 12 in order not to damage the glass base material 10 when the glass base material 10 is put into a cylindrical container 16. The glass base material 10 is then wrapped with three-layers of air packing material 14. The number of layers of air packing material 14 wrapping on the glass base material 10 can be changed depending on the diameter of the glass base material 10 and inside diameter of the cylindrical container 16. The air packing material contains air inside to act as a cushion. Next, the glass base material 10 wrapped with the air packing material 14 is put into the cylindrical container 16. Then, both ends of the cylindrical container 16 are capped with caps.

The cylindrical container 16 and the caps can be made of at least one of cardboard, plastic, and cardboard plastic that can withstand the load of the glass base material 10. The cylindrical container 16 and caps can also be made of wood or metal. Cardboard plastic is made by processing plastic into a cardboard form. Although cardboard has enough strength to withstand the load of the glass base material 10, plastic is preferably used for the cylindrical container 16 because plastic has greater strength than cardboard. Furthermore, a container made from plastic can be recycled. The cylindrical container 16 has an inside diameter 10 mm larger than the diameter of the glass base material 10 in order to have enough room for the air packing material 14.

EXAMPLE 1

A glass base material 10 having a diameter of 60 mm and length of 1000 mm was put into a plastic bag 12 and wrapped with three-layers of an air packing material 14. Next, the glass base material 10 wrapped with the air packing material was put into the cylindrical cardboard box 16. The cylindrical cardboard box 16 had an inside diameter of 80 mm and length of 1100 mm. Then, both ends of the cylindrical cardboard box were capped with caps. The caps were made of cardboard.

Because there was no space between the glass base material 10 and the cylindrical container 16, the glass base material 10 could not move or rotate inside the cylindrical container 16. Furthermore, because the glass base material 10 was wrapped with elastic air packing material 14, the glass base material 10 did not suffer any impact caused by collision of the glass base materials with each other during transportation.

COMPARATIVE EXAMPLE 1

Figure 2:
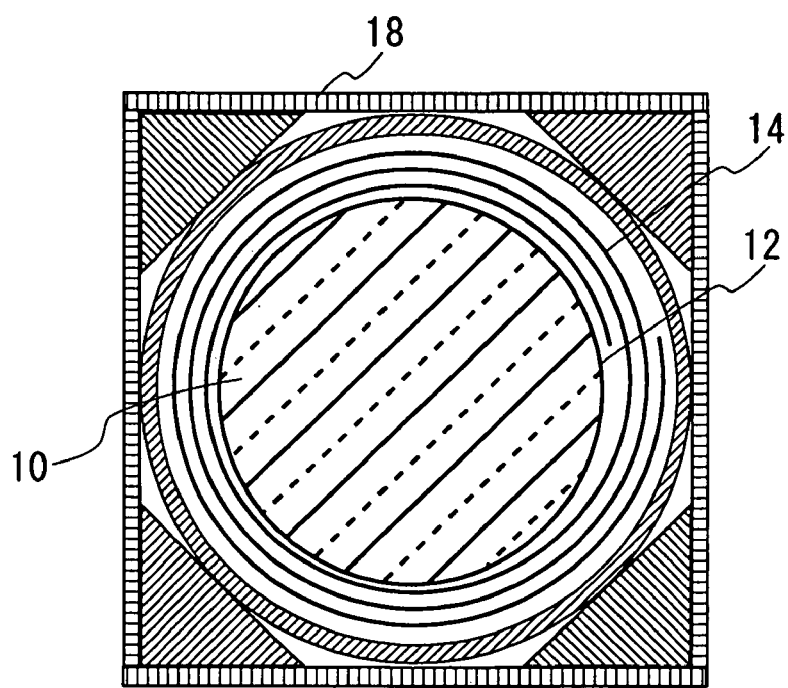
FIG. 2 shows a packing method of a comparative example to the packing method shown in FIG. 1.

FIG. 2 shows a packing method of a comparative example to the packing method shown in FIG. 1. The glass base material 10 was put into a plastic bag 12 and wrapped with three-layers of an air packing material 14. Next, the glass base material 10 wrapped with the air packing material was put into a square-shaped cardboard box 18. The square-shaped cardboard box 18 had an inside height and width of 80 mm and inside length of 1100 mm. Then, both ends of the square-shaped cardboard box 18 were capped with caps. The caps were made of cardboard.

To pack the glass base material 10 inside the square-shaped cardboard box 18, each corner of the square-shaped cardboard box 18 had to be filled with elastic buffer materials so that the glass base material 10 did not move inside the square-shaped cardboard box 18 during transportation. Therefore, the cost for packing increased because of the use of extra material such as buffer materials and because of the extra time needed for packing the buffer materials into the corners of the square-shaped cardboard box 18.

Figure 3:
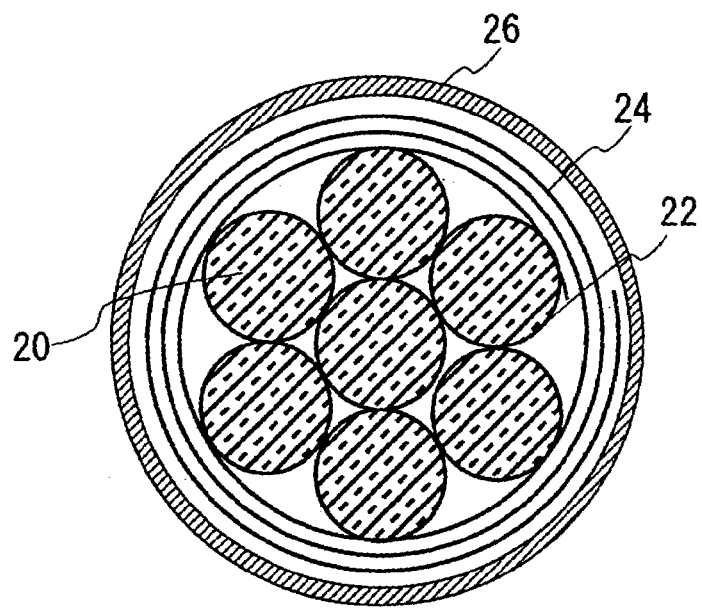
FIG. 3 shows another embodiment of the packing method of the present invention.

FIG. 3 shows another embodiment of the packing method of the present invention. Each of seven pieces of glass base material 20 is put into each of individual plastic bags 22 so as not to damage the glass base material 20 when the glass base material 20 is put into the cylindrical container 26. Then, the seven pieces of glass base material 20 are bundled together such that six pieces of the glass base material 20 are arranged in a hexagonal arrangement around one central glass base material 20. Next, the seven pieces of the glass base material 20 bundled together in the hexagonal arrangement are wrapped with three-layers of air packing material 24. The number of layers of air packing material 24 wrapping on the glass base material 20 can be changed depending on the diameter of the glass base material 20 and inside diameter of the cylindrical container 26. Next, the seven pieces of the glass base material 20 wrapped with the air packing material 24 are put into the cylindrical container 26. Then, both ends of the cylindrical container 26 are capped with caps.

The cylindrical container 26 and the caps may be made of at least one of cardboard, plastic, and cardboard plastic, which can withstand the load of the glass base material 20. The cylindrical container 26 and the caps may also be made of wood or metal. The cylindrical container 26 has an inside diameter 10 mm larger than the total diameter of the seven pieces of glass base material 20 bundled together in a hexagonal arrangement in order to have a room for the air packing material 24.

EXAMPLE 2

Each of the seven pieces of glass base material 20 was put into each of individual plastic bags 22. Each of the glass base materials 20 had a 20 mm diameter and 1000 mm length. Then, the seven pieces of glass base material 20 were bundled together such that six pieces of glass base material 20 were arranged in a hexagonal arrangement around one central glass base material 20.

Next, the seven pieces of glass base material 20 were wrapped with three-layers of air packing material 24. The seven pieces of glass base material 20 wrapped with the air packing material 24 were then put into the cylindrical container 26. The cylindrical container 26 had an inside diameter of 80 mm and inside length of 1100 mm. Then, both ends of the cylindrical container 26 were capped with caps. The caps were made of cardboard.

Because there was no space between the glass base materials 20 and the cylindrical container 26, the glass base materials 20 could not move or rotate inside the cylindrical container 26. Furthermore, because the glass base materials 20 were wrapped with air packing material 24 having elasticity, the glass base materials 20 did not suffer any impact caused by collisions of the glass base materials 20 with each other during transportation.

COMPARATIVE EXAMPLE 2

Figure 4:
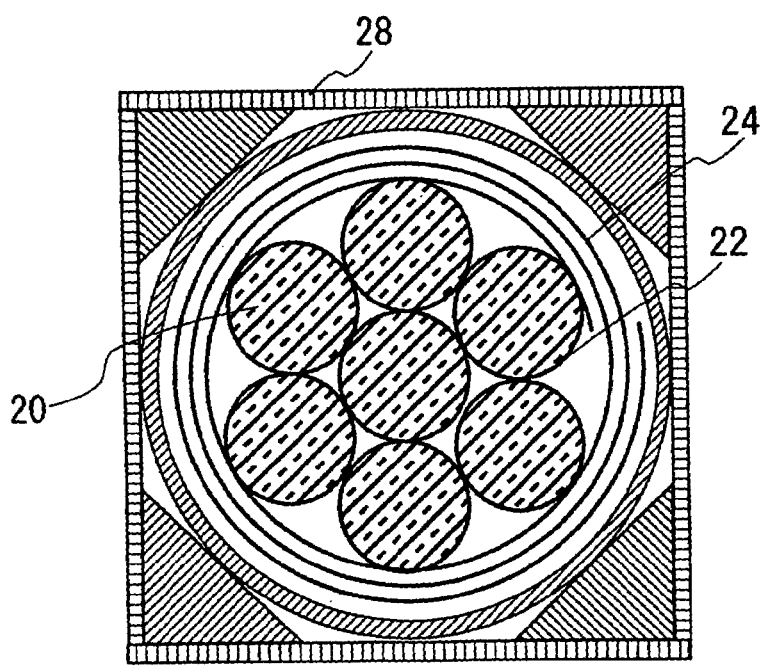
FIG. 4 shows a packing method of a comparative example to the packing method shown in FIG. 3.

FIG. 4 shows a packing method of a comparative example to the packing method shown in FIG. 3. Each of seven pieces of glass base material 20 were put into each of individual plastic bags 22. Each of the glass base materials 20 had a 20 mm diameter and 1000 mm length. Then, the seven pieces of glass base material 20 were bundled together such that six pieces of the glass base material 20 were arranged in a hexagonal arrangement around one central glass base material 20.

Next, the seven pieces of glass base material 20 were wrapped with three-layers of air packing material 24. The seven pieces of glass base material 20 wrapped with the air packing material 24 were then put into the square-shaped cardboard box 28. The square-shaped cardboard box 28 had an inside height and width of 80 mm and inside length of 1100 mm. Then, both ends of the square-shaped cardboard box 28 were capped with caps. The caps were made of cardboard.

To pack glass base materials 20 inside the square-shaped cardboard box 28, each corner of the square-shaped cardboard box 28 had to be filled with elastic buffer materials so that the glass base materials 20 did not move inside the square-shaped cardboard box 28 during transportation. Therefore, the cost for packing increased because of use of the extra materials such as buffer materials and because of the extra time needed for packing the buffer materials into the corners of the square-shaped cardboard box 28.

Figure 5:
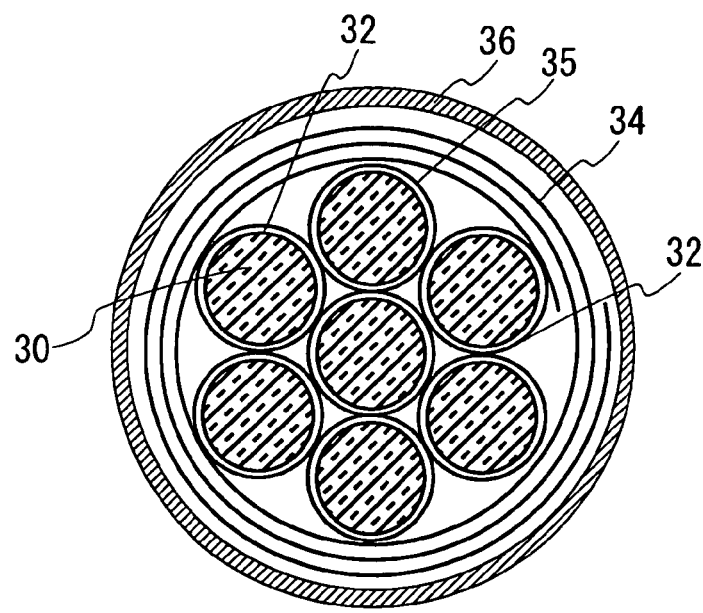
FIG. 5 shows another embodiment of the packing method of the present invention.

FIG. 5 shows another embodiment of the packing method of the present invention. Each of seven pieces of glass base material 30 is put into each of individual plastic bags 32. Then, each of the Fm seven pieces of glass base material 30 put into each of individual plastic bags 32 is further wrapped with the air packing material 35. The seven pieces of glass base material 30 are bundled together such that six pieces of the glass base material 30 are arranged in a hexagonal arrangement around one central glass base material 30. Next, the seven pieces of glass base material 30 are wrapped with three-layers of air packing material 34. The numbers of layers of air packing material 34 wrapping the glass base material 30 can be changed depending on the diameter of the glass base material 30 and the inside diameter of the cylindrical container 36. Next, the seven pieces of glass base material 30 wrapped with air packing material 34 are put into the cylindrical container 36. Then, both ends of the cylindrical container 36 are capped with caps.

The cylindrical container 36 and the caps can be made of at least one of cardboard, plastic, and cardboard plastic which can withstand the load of the glass base material 30. The cylindrical container 36 and the caps can also be made of wood or metal. The cylindrical container 36 has an inside diameter 10 mm larger than the total diameter of the seven pieces of glass base material 30 bundled together in a hexagonal arrangement in order to have a room for the air packing material 34.

EXAMPLE 3

Each of seven pieces of glass base material 30 were put into each of individual plastic bags 32. Each of the glass base materials 30 had a 20 mm diameter and 1000 mm length. Then, each of the seven pieces of glass base material 30 put into each of the individual plastic bags 32 was further wrapped with air packing material 36. Next, the seven pieces of glass base material 30 were bundled together such that six pieces of the glass base material 30 were arranged in a hexagonal arrangement around one central glass base material 30.

Next, the seven pieces of glass base material 30 were wrapped with three-layers of air packing material 34. The seven pieces of glass base material 30 wrapped with the air packing material 34 were then put into a cylindrical container 36. The cylindrical container 36 had an inside diameter of 80 mm and inside length of 1100 mm. Then, both ends of the cylindrical container 36 were capped with caps. The caps were made of cardboard.

Because there was no space between the glass base materials 30 and the cylindrical container 36, the glass base materials 30 could not move or rotate inside the cylindrical container 36. Furthermore, because the glass base materials 30 were wrapped with elastic air packing material 34 and 35, the glass base materials 30 did not suffer any impact caused by collisions of the glass base materials 30 with each other during transportation.

COMPARATIVE EXAMPLE 3

Figure 6:
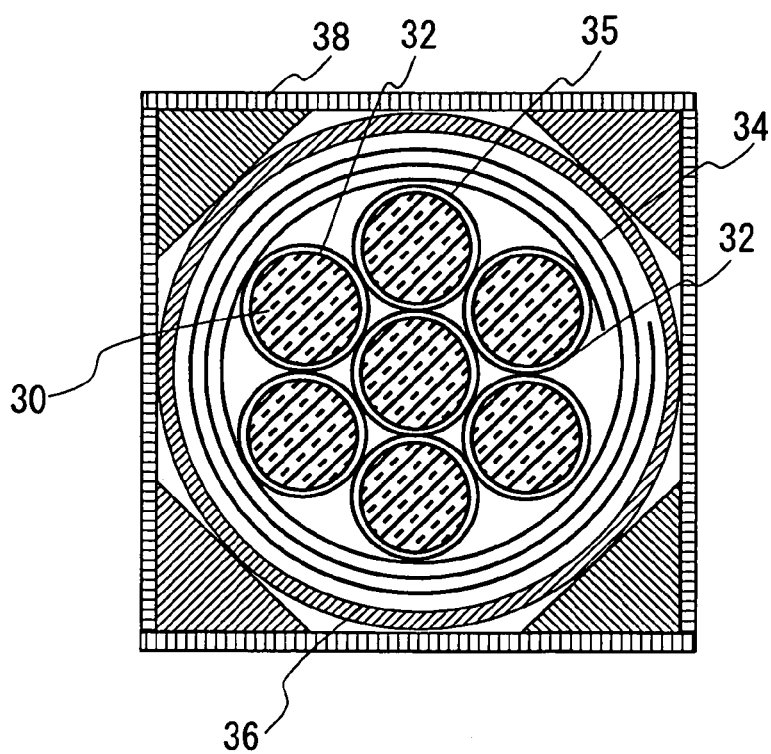
FIG. 6 shows a packing method of a comparative example to the packing method shown in FIG. 5.

FIG. 6 shows a packing method of a comparative example to the packing method shown in FIG. 5. Each of seven pieces of glass base material 30 were put into each of individual plastic bags 32. Each of the glass base materials 30 had a 20 mm diameter and 1000 mm length. Then, each of the seven pieces of glass base material 30 put into the each of the individual plastic bags 32 was further wrapped with air packing material 35. Next, the seven pieces of glass base material 30 were bundled together such that six pieces of the glass base material 30 were arranged in a hexagonal arrangement around one central glass base material 30.

Next, the seven pieces of glass base material 30 were wrapped with three-layers of air packing material 34. The seven pieces of glass base material 30 wrapped with the air packing material 34 were then put into a square-shaped cardboard box 38. The square-shaped cardboard box 38 had an inside height and width of 80 mm and inside length of 1100 mm. Then, both ends of the square-shaped cardboard box 38 were capped with caps. The caps were made of cardboard.

To pack glass base materials 30 inside a square-shaped cardboard box 38, each corner of the square-shaped cardboard box 38 had to be filled with elastic buffer materials so that the glass base materials 30 did not move inside the square-shaped cardboard box 38 during transportation. Therefore, the cost for packing increased because of the use of extra materials such as buffer materials and because of the extra time needed for packing the buffer materials into the corners of the square-shaped cardboard box 38.

Figure 7:
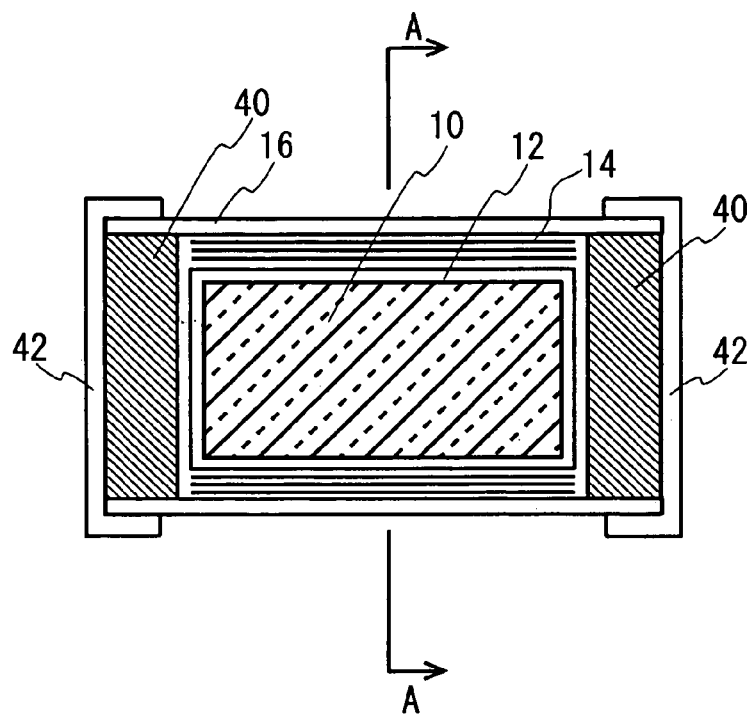
FIG. 7 shows another embodiment of the packing method of the present invention.

FIG. 7 shows another embodiment of the packing method of the present invention. The elements having a same coding between FIG. 1 and FIG. 7 have same structure and functions. The A—A cross section of FIG. 7 is identical to FIG. 1.

The cushion materials 40 are provided on the front and the rear of the glass base material 10 along the longitudinal direction of the glass base material 10. The cushion materials 40 can be made of material that can absorb impacts caused by vibrations occurring during transportation, such as styrene foam or an elastic body such as rubber. Then, both ends of the cylindrical container 16 are capped with caps 42. The caps 42 can be made of at least one of cardboard, plastic, and cardboard plastic. The caps 42 may also be made of wood or metal.

The cushion materials 40 can protect both ends of the glass base material 10 by preventing damage caused by contact between the glass base material 10 and the caps 42 during transportation. In FIG. 7, the shape of the glass base material 10 is a right-angle shape. However, the cushion materials 40 can be used for a glass base material 10 having cone-shaped ends.

EXAMPLE 4

A glass base material 10 having a diameter of 60 mm and length of 1000 mm was put into a plastic bag 12 and wrapped with three-layers of an air packing material 14 The shapes of both ends of the glass base material 10 were cone-shape. Next, the glass base material 10 wrapped with the air packing material was put into a cylindrical cardboard box 16. The cylindrical cardboard box 16 had an inside diameter of 80 mm and inside length of 1200 mm. Next, the cushion materials 40 made of styrene foam were provided on the front and the rear of the glass base material 10 in the longitudinal direction of the glass base material 10. Then, both ends of the cylindrical cardboard box were capped with caps made of cardboard.

Because the cushion materials 40 protected both ends of the glass base material 10, damage caused by contact between the glass base material 10 and the caps 42 during transportation was prevented.

Figure 8:
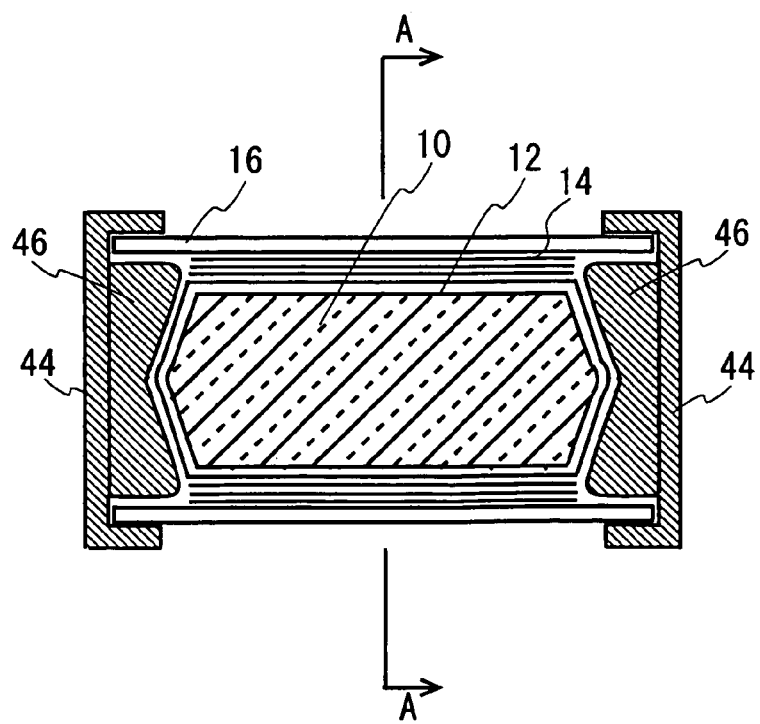
FIG. 8 shows another embodiment of the packing method of the present invention.

FIG. 8 shows another embodiment of the packing method of the present invention. The elements having a same coding between FIG. 1 and FIG. 8 have same structure and functions. The A—A cross section of the FIG. 8 is identical to FIG. 1.

Both ends of the glass base material 10 shown in FIG. 8 have a cone-shape. Inside caps 46, which have a shape that can fit with the shape of each end of the glass base material 10, are provided on both ends of the glass base material 10. The inside caps 46 can be made of material that can absorb impacts caused by vibrations occurring during transportation, such as styrene foam or an elastic body such as rubber. Then, both ends of the cylindrical container 16 are capped with caps 44. The caps 44 can be made of at least one of cardboard, plastic, and cardboard plastic. The caps 44 may also be made of wood or metal.

The inside caps 46 can protect both ends of the glass base material 10 by fixing the position of the glass base material 10 inside the cylindrical container 16. Therefore, the inside caps 46 can prevent damage caused by contact between the glass base material 10 and the caps 44 during transportation.

EXAMPLE 5

A glass base material 10 having a diameter of 60 mm and length of 1000 mm was put into a plastic bag 12 and wrapped with three-layers of an air packing material 14. The shapes of both ends of the glass base material 10 were cone-shape. Next, the glass base material 10 wrapped with the air packing material was put into a cylindrical cardboard box 16. The cylindrical cardboard box 16 had an inside diameter of 80 mm and inside length of 1200 mm. Inside caps 46, which have a shape that can fit with the shape of each end of the glass base material 10, are provided on both ends of the glass base material 10. The inside caps 46 were made of styrene foam. Then, both ends of the cylindrical cardboard box were capped with caps made of cardboard.

Because the inside caps 46 protected both ends of the glass base material 10 by fixing the position of the glass base material 10 inside the cylindrical container 16, there was no damage caused by contact between the glass base material 10 and the caps 44 during transportation.

Figure 9:
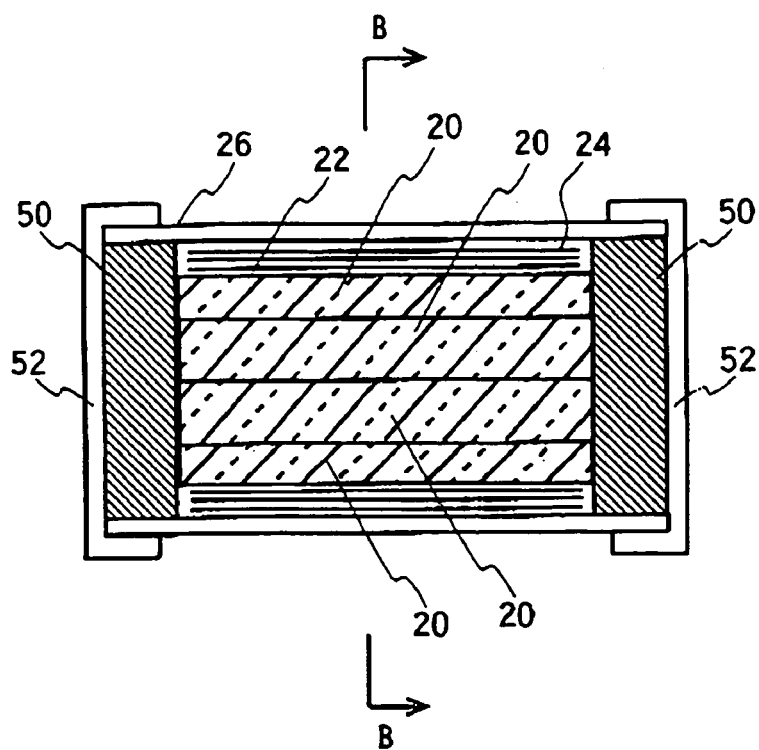
FIG. 9 shows other embodiment of the packing method, combining the embodiment shown in FIG. 3 and the embodiment shown in FIG. 7.

FIG. 9 shows other embodiment of the packing method, combining the embodiment shown in FIG. 3 and the embodiment shown in FIG. 7. The elements having a same coding between FIG. 3 and FIG. 9 have a same structure and functions. The B—B cross section of FIG. 9 is identical to FIG. 3. The packing method shown in FIG. 9 can also be applied to glass base material 20 packed as having a cross section shown in FIG. 5.

The seven pieces of glass base material 20 wrapped with the air packing material 24 shown in FIG. 3 are put into the cylindrical container 26. The cushion materials 50 are provided on the front and the rear of the glass base materials 20 along the longitudinal direction of the glass base materials 20. The cushion materials 50 can be made of styrene foam or an elastic body such as rubber. Then, both ends of the cylindrical container 26 are capped with caps 52. The caps 42 can be made of at least one of cardboard, plastic, and cardboard plastic. The caps 42 may also be made of wood or metal.

The cushion materials 50 can protect both ends of the glass base material 20 by preventing damage caused by contact between the glass base material 20 and the caps 52 during transportation. In FIG. 9, the shape of the glass base material 20 is a right-angle shape. However, the cushion materials 50 can be used for glass base materials 20 having cone-shaped ends.

Figure 10:
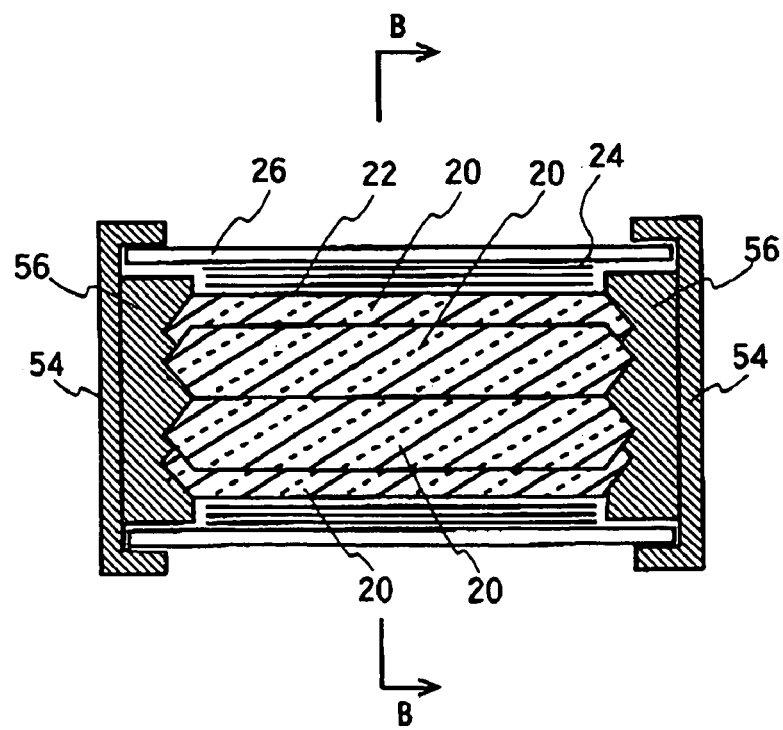
FIG. 10 shows another embodiment of the packing method combining the embodiment shown in FIG. 3 and the embodiment shown in FIG. 8.

FIG. 10 shows another embodiment of the packing method combining the embodiment shown in FIG. 3 and the embodiment shown in FIG. 8. The elements having a same coding between FIG. 3 and FIG. 10 have same structure and functions. The B—B cross section of FIG. 10 is identical to FIG. 3. The packing method shown in FIG. 10 can also be applied to glass base material 20 packed as having a cross section shown in FIG. 5.

The seven pieces of glass base materials 20 wrapped with the air packing material 24 shown in FIG. 3 are put into the cylindrical container 26. Both ends of the glass base material 20 shown in FIG. 10 have a cone-shape. The inside caps 56, which have a shape that can fit with the shape of each end of the glass base materials 20, are provided on both ends of the glass base materials 20. The inside caps 46 can be made of styrene foam or an elastic body such as rubber. Then, both ends of the cylindrical container 26 are capped with caps 54. The caps 54 can be made of at least one of cardboard, plastic, and cardboard plastic. The caps 54 may also be made of wood or metal.

The inside caps 56 can protect both ends of the glass base materials 20 by fixing the position of the glass base materials 20 inside the cylindrical container 26. Therefore, the inside caps 56 can prevent damage caused by contact between the glass base material 20 and the caps 54 during transportation.

Figure 11:
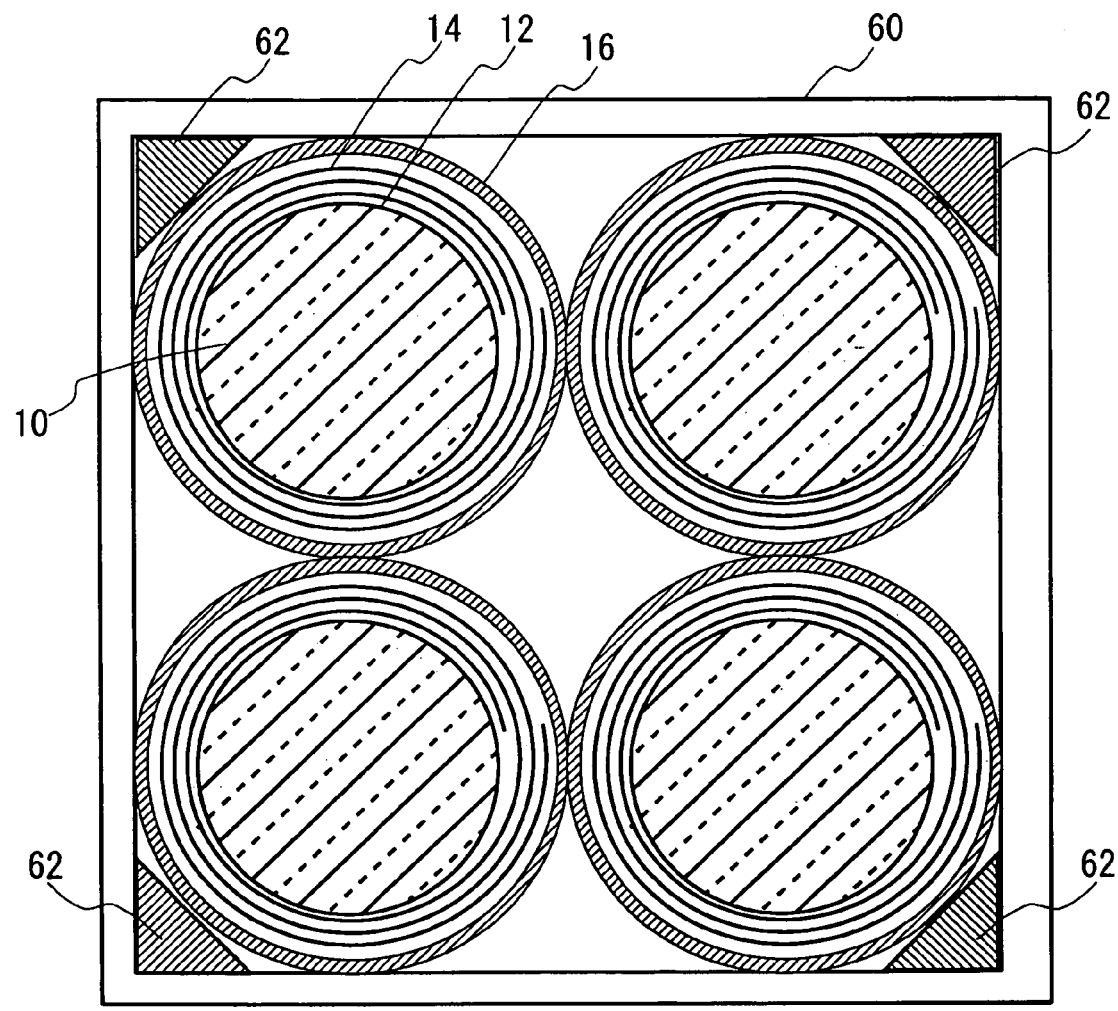
FIG. 11 shows other embodiment of the packing method of the present invention.

FIG. 11 shows other embodiment of the packing method of the present invention. Each of four pieces of glass base material 10 are packed as in FIG. 1 then put into a square-shaped cardboard box 60. Two glass base materials 10 are placed on the bottom of the square-shaped cardboard box 60, and another two glass base materials 10 are placed on top of the two glass base material 10 which were placed on the bottom. Each corner of the square-shaped cardboard box 60 is filled with elastic buffer materials 62 so that the glass base materials 10 do not move inside the square-shaped cardboard box 60 during transportation Using the packing method shown in FIG. 11, a square-shaped cardboard box 18 can be used for packing a plurality of glass base materials 10. The plurality of glass base materials 10 do not suffer from any impacts caused by collision of the glass base material 10 with each other during transportation, even when packed in the square-shaped cardboard box 60, because each glass base material 10 is packed using the packing method shown in FIG. 1.

Because there was no space between the glass base materials 10 and the cylindrical container 16, the glass base materials 10 could not move or rotate inside the cylindrical container 16. Furthermore, because the glass base materials 10 were wrapped with air packing material 14 having elasticity, the glass base materials 10 did not suffer from impacts caused by collision of the glass base materials 10 with each other during transportation.

Figure 12:
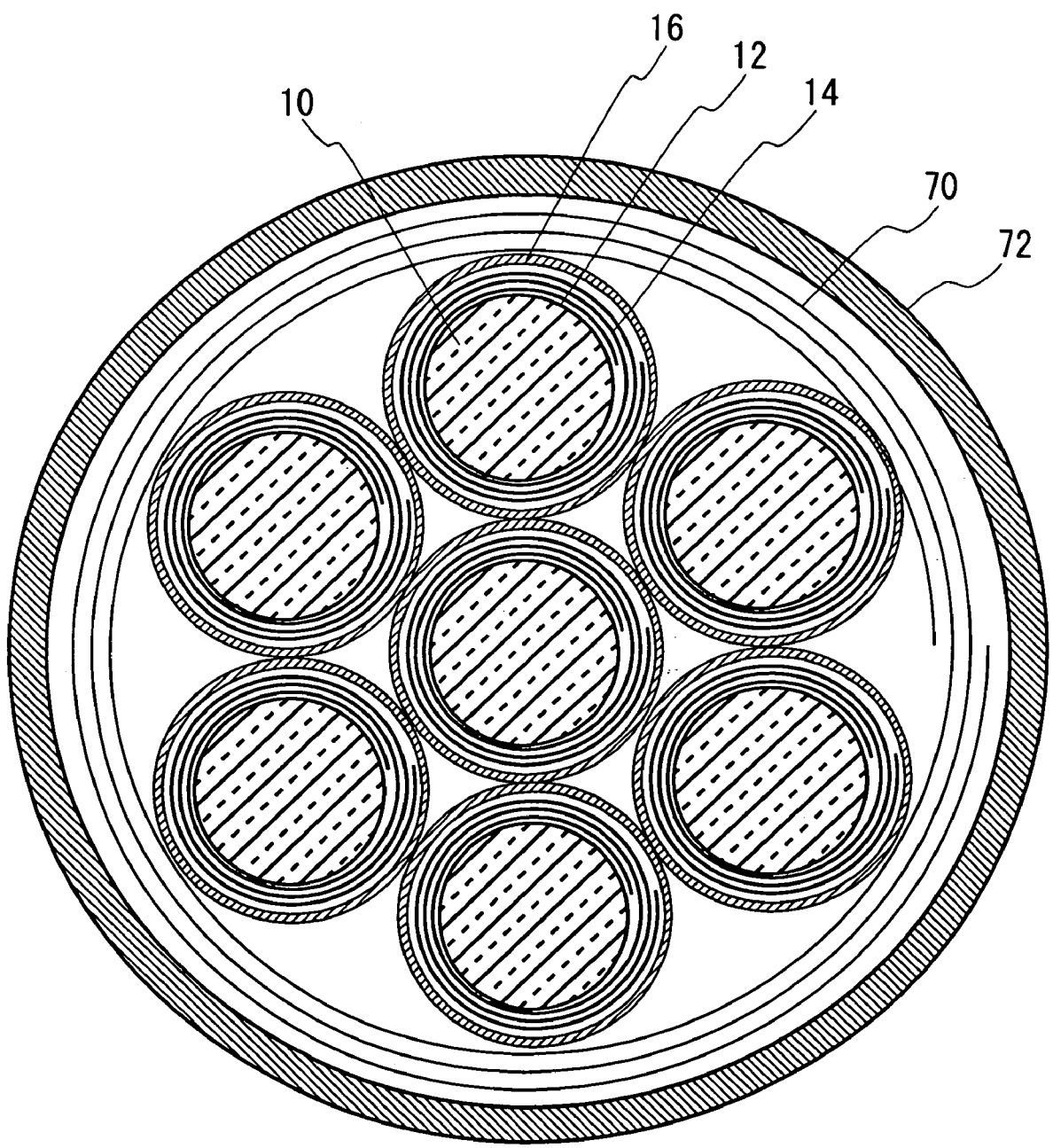
FIG. 12 shows another embodiment of the packing method of the present invention.

FIG. 12 shows another embodiment of the packing method of the present invention. Each of seven pieces of glass base material 10 are packed as in FIG. 1 then further put into the cylindrical container 70. The seven pieces of glass base material 10 packed as in FIG. 1 are bundled together such that six pieces of the glass base material 10 are arranged in a hexagonal arrangement around one central glass base material 10. Next, the seven pieces of the glass base materials 10 are wrapped with three-layers of air packing material 70. The seven pieces of the glass base materials 10 wrapped with the air packing material 70 are then put into the cylindrical container 72. Then, both ends of the cylindrical container 72 are capped with caps.

Using the packing method shown in FIG. 12, a plurality of glass base materials 10 can be transported without damage because each of the glass base materials 10 are packed into the cylindrical container 16 and further packed into the cylindrical container 72.

Although the present invention has been described with reference to specific embodiments, the scope of the present invention is not limited to these embodiments. Those skilled in the art can make various modifications and improvements to these embodiments of the present invention. It is clear from the appended claims that such modifications or improvements are also covered by the scope of the present invention.

What is claimed is:

1. A method of packing a glass base material, which is a base material of an optical fiber, for preventing damage of said glass base material during transportation, comprising:
    putting the glass base material having a cylindrical shape over its whole length into a plastic bag;
    wrapping said plastic bag containing said glass base material with air packing material, which contains air therein;
    packing the glass base material in said plastic bag and wrapped in said air packing material into a cylindrical container so that space between the glass base material and said cylindrical container is filled with said plastic bag and said air packing material.

2. A method as claimed in claim 1, wherein said plastic bag is wrapped with three-layers of said air packing material.

3. A method as claimed in claim 1, wherein said cylindrical container has an inside diameter that is approximately 10 mm larger than a diameter of said glass base material.

4. A method as claimed in claim 1, further comprising:
capping both ends of said cylindrical container.

5. A method of packing a glass base material as claimed in claim 4, wherein said packing further has:
filling space between an end of said glass base material and said cap with a cushion material.

6. A method as claimed in claim 4, further comprising:
providing an inside cap, which has a shape that is compatible with a shape of an end of said glass base material, in a space between said end of said glass base material and said cap.

7. A method of packing a glass base material as claimed in claim 1, further comprising:
packing a plurality of said cylindrical containers, each of which is packed with said bagged and wrapped glass base material, into a cylindrical container.

8. A method of packing a glass base material as claimed in claim 1, further comprising:
packing a plurality of said cylindrical containers, each of which is packed with said glass base material, into a square-shaped box.

9. A method as claimed in claim 1, wherein said cylindrical container is made of at least one of a material selected from the group consisting of cardboard, plastic, cardboard plastic, wood and metal.

* * * * *